UNITED STATES PATENT OFFICE.

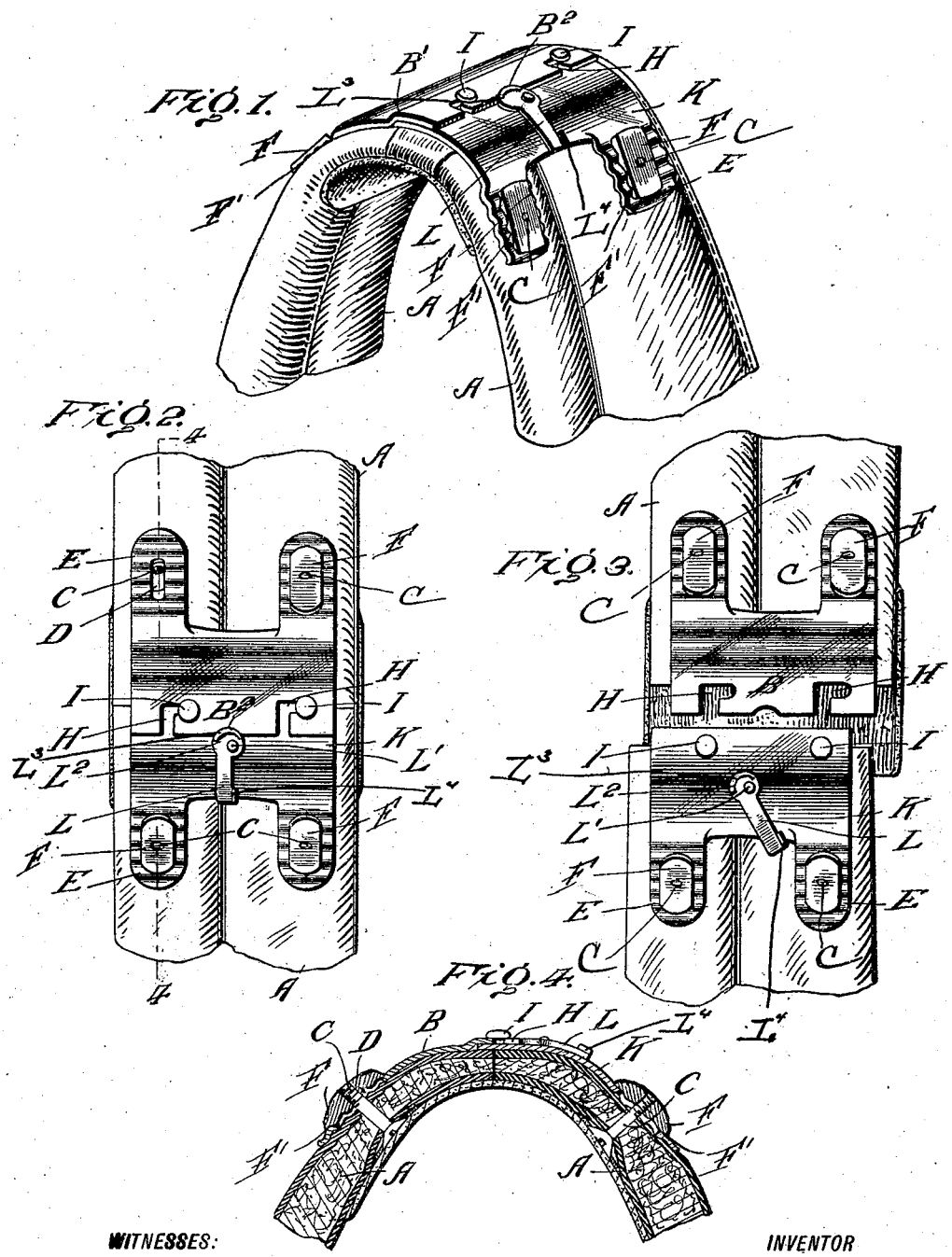

JOHN A. LINN, OF GAYVILLE, SOUTH DAKOTA.

COLLAR-FASTENER.

No. 847,346. Specification of Letters Patent. Patented March 19, 1907.

Application filed February 26, 1906. Serial No. 303,031.

*To all whom it may concern:*

Be it known that I, JOHN A. LINN, a citizen of the United States, residing at Gayville, in the county of Yankton, in the State of South Dakota, have invented a new and useful Improvement in Collar-Fasteners, of which the following is a specification.

This invention relates generally to horse-collars, and more particularly to an improved construction of collar-fastener, the object of the invention being to provide a simple and efficient form of fastening device by means of which the meeting ends of a divided collar can be quickly and easily locked or unlocked; and with this object in view my invention consists, essentially, in the employment of two plates attached to the exterior of the ends of the collar, one of said plates being provided with bayonet-slots and the other one with headed studs to engage said slots, together with means for preventing any movement of the plates after they have been locked together.

The invention consists also in certain details of construction hereinafter fully described, and pointed out in the claims.

In the drawings forming a part of this specification, Figure 1 is a perspective view showing the upper portions of a collar provided with the fastening device constructed in accordance with my invention. Fig. 2 is a top plan view of the same. Fig. 3 is a similar view showing the ends of the collar unfastened and separated. Fig. 4 is a detail sectional view on the line 4 4 of Fig. 2.

Referring to the drawings, A indicates the end of an ordinary horse-collar, which is divided at the upper end. In this class of collars it has been common to connect the ends by means of straps or buckles; but this form of fastening was slow and tedious in operation, and, furthermore, becomes impaired in a short time.

One object of the invention, therefore, is to provide a fastening means which shall not only be quick and easy in operation, but which shall be exceedingly durable, and another object is to provide a form of fastening device which can be applied to any construction of horse-collar.

In practical embodiment of my invention I employ a plate B, which is attached to one end of the collar, upon the exterior thereof, by means of bolts C passing through the collar from the inner side and through the slots D of the corrugated extensions E, formed integral with the plate B, and into the nuts F, the under faces being corrugated, as shown at F'. By having the slotted corrugated extensions I am able to adjust the plate B back or forth, so as to have its outer edge project the proper distance beyond the end of the collar, as most clearly shown in Figs. 2 and 3. The outer edge of this plate has bayonet-slots H produced therein, which slots are adapted to be engaged by the headed studs I, carried by the plate K, which is attached to the opposing end of the collar by means of bolts and nuts exactly the same as the plate B. It will also be noted that the plate B is upset slightly, as shown at B', so that the outer edge of the plate K can slide thereunder when the headed studs are brought into engagement with the slots H. It will be understood that when the ends of the collars are brought together the headed studs are made to engage the bayonet-slots, and for the purpose of locking the plates in this position I employ a catch-lever L, pivoted at L' to the plate K and having an eccentric-shaped head $L^2$, which is adapted to engage a notch $B^2$, produced in the outer edge of the plate B intermediate the bayonet-slots H. The head $L^2$ is upset at $L^3$ to provide a broader bearing for the end of the lever against the plate B, and the opposite end is turned up, as shown at $L^4$, to facilitate the manipulation of the lever. After the plates have been interlocked the catch-lever is thrown to the position shown in Figs. 1 and 2, and the plates are then held against movement of any kind, and consequently cannot become unlocked. When it is desired to unfasten the ends of the collar, the catch-lever is shifted to the position shown in Fig. 3, and the plates can be then unlocked and the ends of the collar separated. Inasmuch as the plates are adjustable, they can be regulated so as to properly engage each other, and, if desired, the fastening means may be detached from one collar and placed upon another. It will thus be seen that I provide an exceedingly cheap, simple, and efficient construction of horse-collar fastener which will operate in the manner described and for the accomplishment of the objects referred to.

Having thus fully described my invention, what I claim, and desire to secure by Letters Patent, is—

1. A horse-collar fastener comprising two plates adapted to be attached to the ends of the collar, one of said plates having bayonet-slots, the other plate having headed studs adapted to engage said slots and means carried by said plate adapted to engage the other plate, for locking both plates against movement.

2. A horse-collar fastener comprising two plates, one of which is provided with bayonet-slots and a notch intermediate the slots, and the other with headed studs, and a catch-lever carried by the stud-plate and adapted to engage the notch produced in the edge of the slotted plate, intermediate the said slots.

3. A horse-collar fastener comprising two plates, each provided with corrugated slotted extensions through which bolts are adapted to be passed, the outer edge of one plate being provided with bayonet-slots and a notch intermediate said slots, the other plate having headed studs, and a catch-lever carried by said plate and adapted to engage the notched edge of the opposing plate, as set forth.

4. A horse-collar fastener comprising two plates, each having corrugated slotted extensions, one plate having bayonet-slots in its edge and a notch intermediate said slots, the other plate having headed studs for engagement with the slots, and a lever pivoted between the studs and adapted to engage the intermediate notch of the opposing plate, both ends of said lever being upset, the bolts for fastening the plates to the collar and the nuts having corrugated under faces adapted to engage the corrugated extensions, as set forth.

JOHN A. LINN.

Witnesses:
  A. BENTSON,
  H. F. SHEPHERDSON.